P. ROSE.
ELECTRIC METER.
APPLICATION FILED SEPT. 1, 1911.

1,085,163.

Patented Jan. 27, 1914.

WITNESSES
J. Earl Ryan
J. Ellis Glen

INVENTOR
PAUL ROSE
BY Albert G. Davis
HIS ATTORNEY

UNITED STATES PATENT OFFICE.

PAUL ROSE, OF BERLIN, GERMANY, ASSIGNOR TO GENERAL ELECTRIC COMPANY, A CORPORATION OF NEW YORK.

ELECTRIC METER.

1,085,163.

Specification of Letters Patent.

Patented Jan. 27, 1914.

Application filed September 1, 1911. Serial No. 647,154.

*To all whom it may concern:*

Be it known that I, PAUL ROSE, a subject of the Emperor of Germany, residing at Berlin, Germany, have invented certain new and useful Improvements in Electric Meters, of which the following is a specification.

My invention relates to electric meters with oscillating armatures and has for its object an improvement in such devices.

More specifically, my invention relates to direct current watthour meters, with oscillating armatures, in which the driving power depends on the action of two fields, one of which is proportional to the main current and the other to the voltage in the circuit to be measured. Such meters are well known and the object of my invention is the construction of an improved form of the same. I accomplish this object by the use of a magnetic member having a certain remanent magnetization which is periodically or intermittently demagnetized by short current impulses produced in a magnetizing coil surrounding the same.

For a further understanding of my invention, reference may be had to the accompanying drawings, where—

Figure 2:
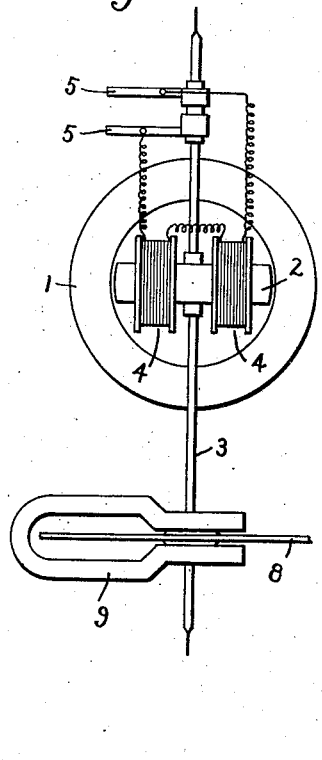
Figure 1:
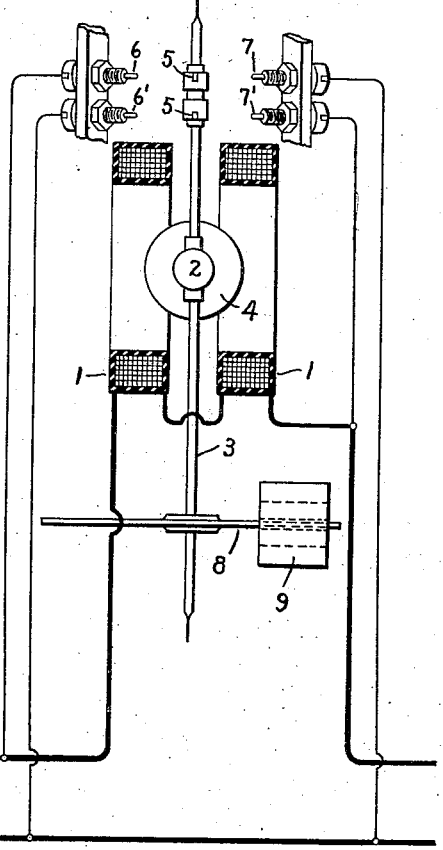

Figure 1 shows diagrammatically and partially in section the main portions of a meter embodying my invention, and Fig. 2 is a vertical view of the same taken from a different position.

Referring to the figures, 1 are current coils shown as connected in series with the circuit to be measured, fixed in position and forming a permanent field. In operative relation with these coils or field is a magnetic member 2, which always possesses a certain remanent magnetization. This magnetic member is attached to a shaft 3 in such a fashion that it may be readily oscillatable. Surrounding the magnetic member are two magnetizing coils 4 connected in series, the free ends of the windings being connected to two contact arms 5 which are rigidly attached in any suitable manner to shaft 3. Each of these contact arms at the end of an oscillation of the shaft and magnetic member makes contact with fixed contacts 6, 6' or 7, 7'. When such contacts are made, during the time of contact, a current flows through the coils 4 proportional to the voltage of the circuit to be measured. When such a current flows, it imparts to the member 2 a magnetization causing the member to move, and, as may readily be seen from an inspection of the drawings, thus breaking the contacts formed between arms 5 and contacts 6, 6' or 7, 7', as the case may be. When the magnetic member and shaft have completed an oscillation, arms 5 will come in contact with the fixed contacts with which they have previously not been in contact and a magnetizing current will flow through the coils in a reverse direction to that which flowed previously, thus causing the magnetic member to reverse its direction of rotation and move in a direction contrary to that in which it has already moved. It is of course understood that the direction of rotation of the magnetic member is reversed by effecting a reversal of the magnetic polarity of the member. From an inspection of the drawings, it will be seen that the current flowing in the windings of coils 4 when contacts 5—5 engage contacts 6—6' is opposite in direction to that which flows when contacts 5—5 engage contacts 7—7'. The magnetic polarity of the member 2, therefore, depends upon whether contacts 5—5 have last engaged contacts 6—6' or 7—7'. The magnetic member is constructed of suitable material, preferably iron, adapted to retain in a permanent form some of the magnetism imparted to it. The magnetic member thus always possesses a certain remanent magnetization tending to turn it in one direction or the other. When current flows in the coils 1, the magnetic member will always tend to turn so that contacts 5—5 engage contacts 6—6' or 7—7', depending upon the magnetic polarity of the member. When such engagement is effected the member 2 is demagnetized with respect to the polarity last imparted to it and is simultaneously remagnetized with opposite polarity. After the interruption of the magnetizing current, the field formed by the remanent magnetism of the iron of the magnetic member in connection with the fixed field of the main current coils then continues the oscillatory movement until contact has been effected at the end of an oscillation and the magnetization in the reverse direction takes place, as has already been explained. A suitable damping mechanism, such as a disk 8 in operative relation with a permanent magnet 9 may be provided. It will be seen that the duration of the current impulses, which cause demagnetization, and subsequent re-magnetization of opposite polarity is small in comparison with the time elapsing between two successive impulses. Since the magnetizing coils are fed by a current proportional to the voltage and the fixed coils by current proportional to the current in the circuit to be measured, it will be obvious that the torque between the fixed and moving members will be proportional to the watts in the circuit and that the meter will therefore operate as a watthour meter.

While I have described a preferred embodiment of my invention, I do not limit myself to this embodiment, but seek in the appended claims to cover all embodiments which will be obvious to those skilled in the art and not depart from the spirit of my invention.

What I claim as new, and desire to secure by Letters Patent of the United States, is,—

1. A meter comprising in combination a fixed coil, an oscillating magnetic member having a remanent magnetization in operative relation therewith, and means for intermittently demagnetizing said member.

2. An electric meter comprising in combination a fixed coil, an oscillating magnetic member having a remanent magnetization in operative relation therewith, and means for intermittently reversing the magnetic polarity of said member.

3. An electric meter comprising in combination a fixed coil, an oscillating magnetic member having a remanent magnetization in operative relation therewith, and means for intermittently demagnetizing said member and for imparting to the member a magnetization of opposite polarity.

4. A meter comprising in combination a fixed coil, an oscillating magnetic member having a remanent magnetization in operative relation therewith, a coil surrounding said member, and means for intermittently energizing said coil.

5. A meter comprising in combination a fixed coil, an oscillating magnetic member having a remanent magnetization in operative relation therewith, a coil surrounding said member, and means for intermittently energizing said coil with current flowing in reverse directions.

6. A watthour meter comprising in combination a coil, a magnetic member having a remanent magnetization in operative relation therewith, a second coil surrounding said member, means for continuously energizing the first coil with a current proportional to the current in the circuit to be measured, and means for intermittently energizing the second coil with a current proportional to the voltage of the circuit to be measured.

7. A watthour meter comprising in combination a fixed current coil, an oscillating magnetic member having a remanent magnetization in operative relation therewith, a coil surrounding said member, and means for intermittently energizing said coil with a current proportional to the voltage of the circuit to be measured.

8. A watthour meter comprising in combination a fixed current coil, an oscillating magnetic member having a remanent magnetization in operative relation therewith, a coil surrounding said member, and means for intermittently energizing said coil in reverse directions with a current proportional to the voltage of the circuit to be measured.

9. A watthour meter comprising in combination a fixed current coil, an oscillating magnetic member having a remanent magnetization in operative relation therewith, a coil surrounding said member, and means dependent upon the movement of the member for intermittently energizing said coil with a current proportional to the voltage of the circuit to be measured.

10. A watthour meter comprising in combination a fixed current coil, an oscillating magnetic member having a remanent magnetization in operative relation therewith, a coil surrounding said member, and means dependent upon the movement of the member for intermittently energizing said coil in reverse directions with a current proportional to the voltage of the circuit to be measured.

In witness whereof, I have hereunto set my hand this 15th day of August, 1911.

PAUL ROSE.

Witnesses:
 JULIUS RÜMLAND,
 ALFRED WOLF.